(12) United States Patent
Peng

(10) Patent No.: US 12,617,405 B2
(45) Date of Patent: May 5, 2026

(54) SYSTEM AND METHOD FOR CONTROLLING VEHICLE BEHAVIOR AND VEHICLE COMPUTER EMPLOYING METHOD

(71) Applicants: Futaijing Precision Electronics (Yantai) Co., Ltd., Yantai (CN); HON HAI PRECISION INDUSTRY CO., LTD., New Taipei (TW)

(72) Inventor: Hsiang-En Peng, New Taipei (TW)

(73) Assignees: Futaijing Precision Electronics (Yantai) Co., Ltd., Yantai (CN); HON HAI PRECISION INDUSTRY CO., LTD., New Taipei (TW)

( * ) Notice: Subject to any disclaimer, the term of this patent is extended or adjusted under 35 U.S.C. 154(b) by 321 days.

(21) Appl. No.: 18/226,755

(22) Filed: Jul. 26, 2023

(65) Prior Publication Data

US 2024/0217518 A1     Jul. 4, 2024

(30) Foreign Application Priority Data

Dec. 29, 2022     (CN) .......................... 202211716703.5

(51) Int. Cl.
    *B60W 30/18*              (2012.01)
(52) U.S. Cl.
    CPC ... *B60W 30/18181* (2013.01); *B60W 2540/10* (2013.01); *B60W 2540/12* (2013.01)
(58) Field of Classification Search
    CPC ....... B60W 30/18181; B60W 2540/10; B60W 2540/12; B60W 2050/146; B60W 50/08; B60W 50/10; B60W 40/09; B60W 2540/00; B60K 2026/046; G06F 3/0334; H01H 3/14; H01H 2300/04; H04M 1/6075

See application file for complete search history.

(56) References Cited

U.S. PATENT DOCUMENTS

| | | | | |
|---|---|---|---|---|
| 2005/0219062 A1* | 10/2005 | Van Bosch | ......... | H04M 1/6075 340/467 |
| 2010/0114450 A1* | 5/2010 | Huang | .................. | B60K 31/00 701/93 |
| 2010/0175936 A1* | 7/2010 | Schneider | ............. | B60W 30/18 180/65.28 |
| 2016/0364621 A1* | 12/2016 | Hill | ........................ | G06V 20/58 |
| 2018/0229669 A1* | 8/2018 | Mckibben | .............. | H04N 23/45 |
| 2018/0236983 A1* | 8/2018 | Moury | ................ | B60W 50/082 |

FOREIGN PATENT DOCUMENTS

| | | |
|---|---|---|
| CN | 114082171 | 2/2022 |

* cited by examiner

*Primary Examiner* — Khoi H Tran
*Assistant Examiner* — Tristan J Greiner
(74) *Attorney, Agent, or Firm* — ScienBiziP, P.C.

(57)     ABSTRACT

A vehicle behavior control method implementing functions of not affecting a driving safety of a vehicle through a pedal, comprises acquiring a pedal duration of the pedal, determining a custom instruction matched with the pedal duration of the pedal, and controlling the vehicle to perform a vehicle behavior corresponding to the custom instruction. A vehicle behavior control system and a vehicle computer are also provided.

11 Claims, 3 Drawing Sheets

SYSTEM AND METHOD FOR CONTROLLING VEHICLE BEHAVIOR AND VEHICLE COMPUTER EMPLOYING METHOD

TECHNICAL FIELD

The subject matter herein generally relates to control technology of vehicles.

BACKGROUND

In current vehicles, on-board systems are paired with screens, and users need a lot of touch operations to execute vehicle controls. For example, a touch process of the screen comprises positioning eyes to the screen and performing a touch operation by fingers to generate a control command.

In the touch process, the driver needs to spend a lot of time staring at the screen, reducing vehicle driving safety.

BRIEF DESCRIPTION OF THE DRAWINGS

Implementations of the present technology will now be described, by way of example only, with reference to the attached figures.

DETAILED DESCRIPTION

Figure 1:
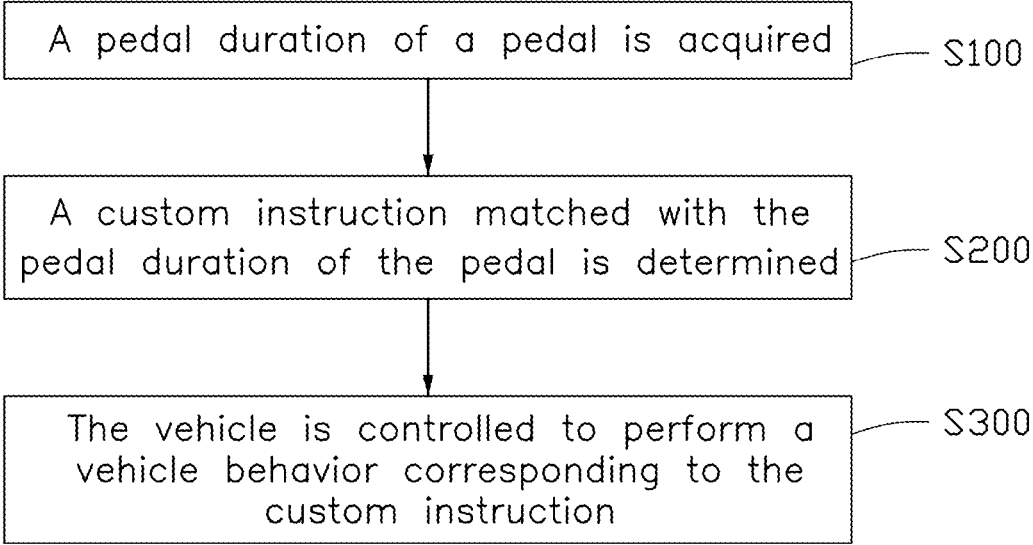
FIG. 1 is a flowchart of an embodiment of a vehicle behavior control method according to the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure. It should be noted that references to "an" or "one" embodiment in this disclosure are not necessarily to the same embodiment, and such references mean "at least one".

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising," when utilized, means "including, but not necessarily limited to"; it specifically indicates open-ended inclusion or membership in the so-described combination, group, series, and the like.

FIG. 1 illustrates one exemplary embodiment of a vehicle behavior control method. The flowchart presents an exemplary embodiment of the method. The exemplary method is provided by way of example, as there are a variety of ways to carry out the method. Each block shown in FIG. 1 may represent one or more processes, methods, or subroutines, carried out in the example method. Furthermore, the illustrated order of blocks is illustrative only and the order of the blocks can change. Additional blocks can be added or fewer blocks may be utilized, without departing from this disclosure. The example method can be operated in a first electronic device and begin at block S100.

In block S100, a pedal duration of a pedal is acquired.

In one embodiment, the vehicle behavior control method can be applied to a vehicle.

Figure 2:
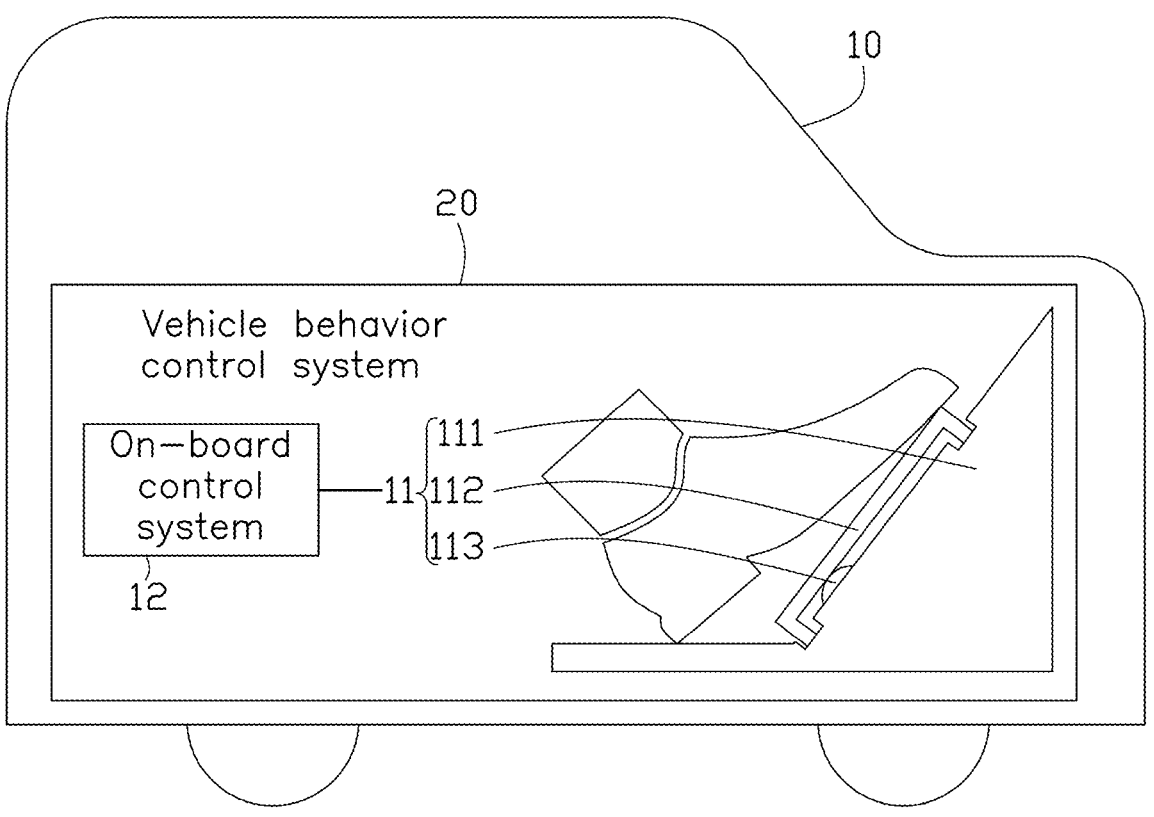
FIG. 2 is a block diagram of an embodiment of a vehicle behavior control system according to the present disclosure.

Referring to FIG. 2, the vehicle 10 can comprise a vehicle behavior control system 20, the vehicle behavior control system 20 can control vehicle behaviors of the vehicle 10 based on user operations, for example, the vehicle behavior control system 20 controls vehicle behaviors of the vehicle 10 based on operations of a driver of the vehicle. The vehicle behavior control system 20 may comprise a pedal device 11 and an on-board control system 12. The pedal device 11 is electrically connected with the on-board control system 12.

In one embodiment, the pedal device 11 can be arranged on a position next to a driving seat. The pedal device 11 can comprise a pedal bracket 111, a pedal 112 and a pedal starting device 113. The pedal bracket 111 is fixedly arranged inside of the vehicle 10, for example, the pedal bracket 111 can be fixedly arranged on a position of a cockpit of the vehicle 10. The pedal 112 is arranged on a side of the pedal bracket 111, and the pedal starting device 113 is abutted between the pedal 112 and the pedal bracket 111.

In one embodiment, the pedal starting device 113 is electrically connected with the on-board control system 12. The pedal starting device 113 can be arranged on a side of the pedal 112, for example, a position of the pedal starting device 113 may correspond to a heel area of a foot of a driver when the driver puts the foot on the pedal 112. The driver can pedal the pedal 112 to control the vehicle 10 to perform corresponding behaviors, for example, adjust a volume of an automotive multimedia or adjust a temperature of an automotive air-conditioner. The pedal starting device 113 is configured to sense a force on the pedal 112.

In one embodiment, in order to match driving habits of drivers, the pedal 112 can be arranged on a position that a left foot of the driver is placed in responding to the driver sitting in the driving seat. It is convenient for the driver to control behaviors of the vehicle 10 by pedaling the pedal 112 through the left foot in a process of driving the vehicle 10.

Fox example, the vehicle 10 may comprise a rest pedal, a brake pedal, and an accelerator pedal. The driver can put the left foot on the rest pedal to take a break, and the driver can put the right foot on the brake pedal to decelerate or brake, or put the right foot on the accelerator pedal to accelerate. The rest pedal can be designed to the pedal device 11, and the driver can adjust the volume of the automotive multimedia, the temperature of the automotive air-conditioner, etc. through the left foot.

In one embodiment, the pedal device 11 may further comprise a damping structure 114. The damping structure 114 can be arranged between the pedal 112 and the pedal bracket 111. When the driver wants to control the behaviors of the vehicle 10 through the pedal 112, the driver needs to pedal a certain amount of force on the pedal 112. Because of the damping structure 114, the driver can also put the left foot on the pedal 112 to take a break, and not trigger controlling the automotive multimedia, the automotive air-conditioner, etc.

In one embodiment, the position of the pedal device 11 may be adjusted according to requirements of different vehicles.

In one embodiment, a pedal pressure data of the pedal 112 can be obtained by sensing a degree of force of the pedal starting device 113. When the pedal pressure data is detected within a preset pressure range, a force duration of the pedal 112 is obtained based on a sensing duration of the pedal starting device 113. The pedal duration of the pedal 112 can be determined based on the force duration of the pedal 112 and a preset duration rule. The preset duration rule can be defined according to an actual application. The pedal duration of the pedal 112 may comprise a short-time pedal and a long-time pedal, and a force duration of the short-time pedal is less than a force duration of the long-time pedal.

In one embodiment, an onboard control system of the vehicle 10 may set the preset pressure range to 50 N~500 N, the preset duration determination rule may set to 1 s~5 s. If the on-board control system 12 detects that the pedal pressure data of the pedal starting device 113 is within the range of 50 N~500 N, and force duration of the pedal starting device 113 is within 1 s-5 s, indicating that the driver pedals the pedal 112 to control behaviors of the vehicle 10. The on-board control system 12 can obtain the pedal duration of the pedal 112 and execution command matched with the pedal duration of the pedal. In other embodiments, the preset pressure range may also be set to 100 N-400 N, effective pedal duration may be set to 0.5 s~6 s, the preset pressure range and the effective pedal duration can be set and adjusted according to the actual application.

For example, the force duration of the pedal starting device 113 is within 1 s~5 s, the pedal duration of the pedal 112 can be a duration while the pedal pressure data of the pedal starting device 113 is within the range of 50 N~500 N.

In block S200, a custom instruction matched with the pedal duration of the pedal is determined.

In one embodiment, the on-board control system 12 can comprise a plurality of custom instructions, different custom instructions correspond to different vehicle behaviors. The vehicle-mounted system 12 can receive the pedal duration from the pedal device 11 and output the custom instruction matched with the pedal duration. For example, the custom instructions can comprise immediate execution instructions and page control instructions. The immediate execution instructions comprise one or more short-pedal immediate execution instructions, one or more long-pedal immediate execution instructions, and one or more self-starting instructions. The page control instructions comprise one or more specific page instructions.

In one embodiment, the immediate execution instructions may comprise playback next item/track, pause/resume playback, destination navigation, turning on or off mood lights, turning on or off air conditioner, starting voice control functions, opening windows or sunroofs, locking door, locking window, etc. The short-pedal immediate execution instructions may comprise playback of the next item/track, pause/resume playback, destination navigation, turning on or off the mood lights, etc. The long-pedal immediate execution instructions may comprise turning on or off the air conditioner, starting the voice control functions, opening windows or sunroofs, locking door, locking window, etc. The page control instructions may comprise opening shortcut pages, enabling 360-degree surround view functions, opening multimedia center pages, opening radio pages, opening assisted driving pages, etc.

In one embodiment, the immediate execution instructions and the page control instructions can be set according to actual driving requirements.

In one embodiment, if the pedal duration of the pedal 112 is the short-time pedal, the custom instruction matched with the pedal duration of the pedal 112 may comprise the short-pedal immediate execution instruction or the specific page instruction. For example, the custom instruction matched with the short-time pedal comprise playback the next item/track or opening a shortcut page. If the pedal duration of the pedal 112 is the long-time pedal, the custom instruction matched with the pedal duration of the pedal 112 may comprise the long-pedal immediate execution instruction, the self-starting instruction, or the specific page instruction. For example, the custom instruction matched with the long-time pedal comprise starting the voice control function, enabling 360-degrees surround view function, or generating a self-starting instruction.

If the self-starting instruction comprises an instruction of recording video, and the custom instruction matched with the long-time pedal comprise generating the self-starting instruction, the on-board control system 12 can open a video recording function based on the instruction of recording video.

In one embodiment, the pedal duration of the short-time pedal can be set as 1 s~3 s, the pedal duration of the long-time pedal can be set as 3 s~5 s. The pedal durations of the short-time pedal and the long-time pedal can be set and adjusted according to actual control requirements.

In block S300, the vehicle is controlled to perform a vehicle behavior corresponding to the custom instruction.

For example, if the custom instruction obtained by the on-board control system 12 is a destination navigation instruction, the on-board control system 12 controls the vehicle to perform a vehicle behavior corresponding to destination navigation instruction. That is, the on-board control system 12 can open the vehicle navigation system to generate a navigation route from the current position to the destination based on the destination navigation instruction.

In one embodiment, the custom instruction may correspond to an initial vehicle behavior. The on-board control system 12 can receive a type of selection information of the custom instruction and update the initial vehicle behavior to a first vehicle behavior based on the type of selection information of the custom instruction. The type of selection information can carry the first vehicle behavior.

In an initial state, the custom command of the short-time pedal is the destination navigation instruction, the initial vehicle behavior is to open the vehicle navigation system for navigating. The driver can select a type of custom command corresponding to the short-time pedal, and the on-board control system 12 can receive the type of selection information of the custom instruction and update the initial vehicle behavior to the first vehicle behavior. For example, the driver selects the custom command corresponding to the short-time pedal as controlling ambient lights, the on-board control system 12 will update the custom command corresponding to the short-time pedal from the destination navigation instruction to control instructions of ambient lights (turn on or off the ambient lights). The on-board control system 12 can control the vehicle to turn on or off the ambient lights in response to the pedal 112 receiving a next short-time pedal.

In one embodiment, when the pedal 112 receives the next short-time pedal, the on-board control system 12 may control the vehicle to close the vehicle navigation system and turn on the ambient lights.

In one embodiment the driver can also select a type of custom command corresponding to the long-time pedal, and the on-board control system 12 can receive the type of selection information of the custom instruction, and update the custom command corresponding to the long-time pedal from one instruction to another instruction, for example, update the custom command corresponding to the long-time pedal from control instructions of air conditioner to control instructions of window.

In one embodiment, the vehicle behavior control method may further comprise displaying the pedal duration of the pedal and execution information of the custom instruction matched with the pedal duration of the pedal 112. For example, the driver can view the pedal duration of the pedal 112 and the execution information of the custom instruction matched with the pedal duration of the pedal 112 through a center panel or an instrument board of the vehicle 10.

For example, the driver views the custom command corresponding to the short-time pedal as the destination navigation through the center panel or the instrument board, if the driver wants to change the custom command corresponding to the short-time pedal, the driver can change the custom command corresponding to the short-time pedal from the destination navigation to other control functions. For example, the driver can change the custom command corresponding to the short-time pedal from the destination navigation to mood light controlling. That is, the driver can change control functions of the custom instruction corresponding to the short-time pedal, and control functions of the custom instruction corresponding to the long-time pedal according to the actual requirements.

The pedal device 11 is designed at an ergonomic angle, the driver can use a foot (for example, left foot) to quickly operate functions of the on-board control system 12, to reduce function definitions of physical buttons of a steering wheel. The need for distraction to focus on the screen and finger touch operation is reduced, and the convenience of operation and driving safety are improved. That is, the vehicle behavior control method can avoid problems of diverting a sight and pairing with finger operation of the driver to perform a control operation, improving vehicle driving safety.

Figure 3:
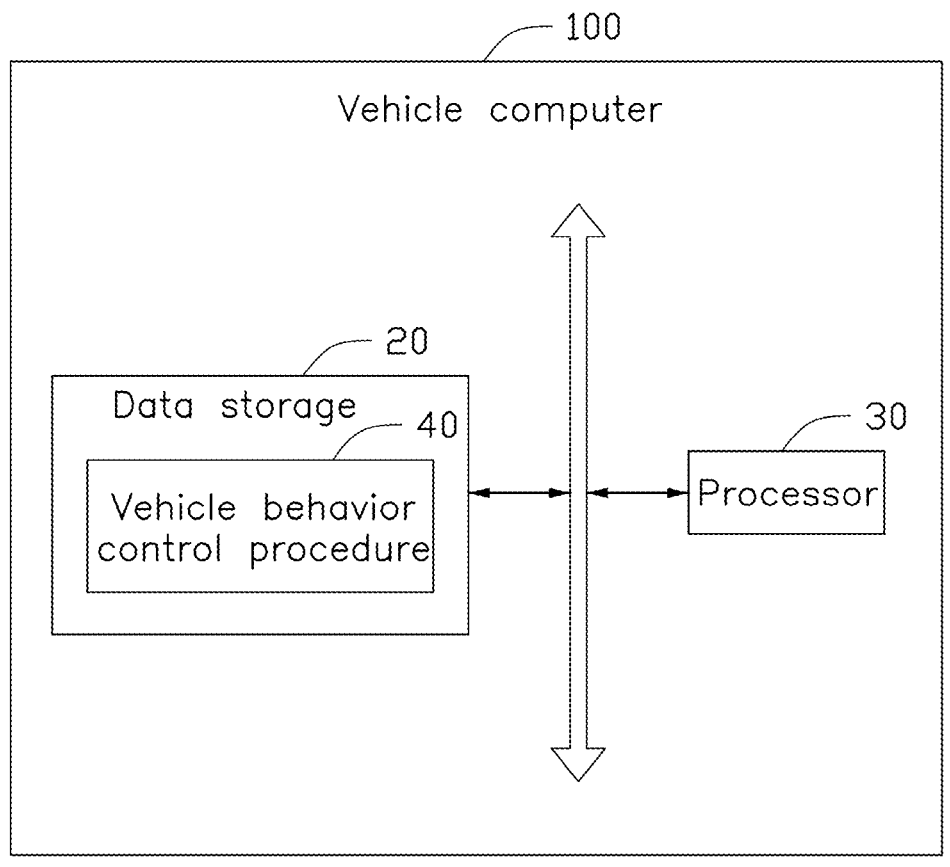
FIG. 3 is a block diagram of an embodiment of a vehicle computer according to the present disclosure.

Referring to FIG. 3, a vehicle computer 100 can comprise at least one data storage 20, at least one processor 30, and a vehicle behavior control procedure 40. The vehicle computer 100 is set in the vehicle 10. The vehicle computer 100 can act as the on-board control system 12.

In one embodiment, the data storage 20 can be set in the electronic device 100, or can be a separate external memory card, such as an SM card (Smart Media Card), an SD card (Secure Digital Card), or the like. The data storage 20 can include various types of non-transitory computer-readable storage mediums. For example, the data storage 20 can be an internal storage system, such as a flash memory, a random access memory (RAM) for the temporary storage of information, and/or a read-only memory (ROM) for permanent storage of information. The data storage 20 can also be an external storage system, such as a hard disk, a storage card, or a data storage medium. The processor 30 can be a central processing unit (CPU), a microprocessor, or other data processor chip that achieves the required functions.

In one embodiment, the vehicle behavior control procedure 40 may comprise a plurality of modules, and the modules can comprise one or more software programs in the form of computerized codes stored in the data storage 20. The computerized codes can include instructions that can be executed by the processor 30 to implement the above-mentioned of vehicle behavior control method.

In other embodiments, comparing with FIG. 3, the vehicle computer 100 can comprise more or less elements, for example, the vehicle computer 100 can further comprise communication elements, buses elements.

The exemplary embodiments shown and described above are only examples. Many such details are neither shown nor described. Even though numerous characteristics and advantages of the present technology have been set forth in the foregoing description, together with details of the structure and function of the present disclosure, the disclosure is illustrative only, and changes may be made in the detail, including in matters of shape, size, and arrangement of the parts within the principles of the present disclosure, up to and including the full extent established by the broad general meaning of the terms used in the claims. It will therefore be appreciated that the exemplary embodiments described above may be modified within the scope of the claims.

What is claimed is:

1. A vehicle behavior control method applied to a vehicle with a brake pedal, an accelerator pedal, and a pedal device, the pedal device comprising a pedal, a pedal bracket, and a pedal sensing element, wherein the pedal bracket is arranged inside the vehicle, the pedal is arranged on a side of the pedal bracket, and the pedal sensing element is configured for sensing a force on the pedal in a case that the pedal sensing element is abutted between the pedal and the pedal bracket, the vehicle behavior control method comprising:

acquiring a pedal pressure data of the pedal by collecting, from the pedal sensing element, an amount of the force on the pedal;

determining a force duration of the force on the pedal according to a sensing duration of the pedal sensing element in a case that the pedal pressure data is within a preset pressure range;

determining a pedal duration on the pedal according to the force duration of the force on the pedal and a preset duration rule, and categorizing the pedal duration into a short-time pedal and a long-time pedal, wherein the force duration of the short-time pedal is less than the force duration of the long-time pedal;

determining a custom instruction matched with the pedal duration on the pedal, wherein different custom instructions correspond to different vehicle behaviors; and controlling the vehicle to perform a vehicle behavior corresponding to the custom instruction.

2. The vehicle behavior control method of claim 1, wherein the custom instruction is provided with immediate execution instructions and page control instructions, the immediate execution instructions are provided with one or more short-pedal immediate execution instructions, one or more long-pedal immediate execution instructions, and one or more self-starting instructions, and the page control instructions are provided with one or more specific page instructions, and determining the custom instruction matched with the pedal duration on the pedal further comprises:

determining the custom instruction is provided with the short-pedal immediate execution instruction or the specific page instruction if the pedal duration on the pedal is the short-time pedal; and determining the custom instruction is provided with the long-pedal immediate execution instruction, the self-starting instruction, or the specific page instruction if the pedal duration on the pedal is the long-time pedal.

3. The vehicle behavior control method of claim 2, wherein controlling the vehicle to perform the vehicle behavior corresponding to the custom instruction further comprises:

obtaining the self-starting instruction corresponding to the long-time pedal if the pedal duration on the pedal is the long-time pedal, wherein the self-starting instruction is provided with an instruction of recording video; and opening a video recording function of the vehicle based on the instruction of recording video.

4. The vehicle behavior control method of claim 1, wherein the custom instruction corresponds to an initial vehicle behavior, the vehicle behavior control method further comprises:

receiving a type of selection information of the custom instruction; and updating the initial vehicle behavior to a first vehicle behavior based on the type of selection information of the custom instruction, wherein the type of selection information carries the first vehicle behavior.

5. The vehicle behavior control method of claim 4, further comprising:

displaying the pedal duration on the pedal and execution information of the custom instruction matched with the pedal duration on the pedal.

6. A vehicle behavior control system applied to a vehicle with a brake pedal and an accelerator pedal, the vehicle behavior control system comprising:

a pedal device and an on-board control system, wherein the pedal device is electrically connected with the on-board control system, the on-board control system receives a pedal duration from the pedal device and outputs a custom instruction matched with the pedal duration; and the pedal device comprises a pedal bracket, a pedal, and a pedal sensing element, wherein the pedal bracket is arranged inside the vehicle, the pedal sensing element is electrically connected with the on-board control system, the pedal is arranged on a side of the pedal bracket, and the pedal sensing element is abutted between the pedal and the pedal bracket for sensing a force on the pedal;

wherein a pedal pressure data of the pedal is acquired by collecting an amount of the force on the pedal from the pedal sensing element; when the pedal pressure data is detected within a preset pressure range, a force duration of the force on the pedal is determined based on a sensing duration of the pedal sensing element; and the pedal duration is determined based on the force duration of the pedal and a preset duration rule, the pedal duration on the pedal is categorized into a short-time pedal and a long-time pedal, and the force duration of the short-time pedal is less than the force duration of the long-time pedal.

7. A vehicle computer applied to a vehicle with a brake pedal, an accelerator pedal, and a pedal device, the pedal device comprising a pedal, a pedal bracket, and a pedal sensing element, wherein the pedal bracket is arranged inside the vehicle, the pedal is arranged on a side of the pedal bracket, and the pedal sensing element is configured for sensing a force on the pedal in a case that the pedal sensing element is abutted between the pedal and the pedal bracket, the vehicle computer comprising:

at least one processor; and a data storage storing one or more programs which when executed by the at least one processor, cause the at least one processor to:

acquire a pedal pressure data of the pedal by collecting, from the pedal sensing element, an amount of the force on the pedal;

determine a force duration of the force on the pedal according to a sensing duration of the pedal sensing element in a case that the pedal pressure data is within a preset pressure range;

determine a pedal duration on the pedal according to the force duration of the force on the pedal and a preset duration rule, and categorize the pedal duration into a short-time pedal and a long-time pedal, wherein the force duration of the short-time pedal is less than the force duration of the long-time pedal;

determine a custom instruction matched with the pedal duration on the pedal, wherein different custom instructions correspond to different vehicle behaviors; and control the vehicle to perform a vehicle behavior corresponding to the custom instruction.

8. The vehicle computer of claim 7, wherein the custom instruction comprises immediate execution instructions and page control instructions, the immediate execution instructions comprise one or more short-pedal immediate execution instructions, one or more long-pedal immediate execution instructions, and one or more self-starting instructions, and the page control instructions comprise one or more specific page instructions, and the at least one processor is configured to determine the custom instruction matched with the pedal duration on the pedal, is further configured to:

determine the custom instruction comprises the short-pedal immediate execution instruction or the specific page instruction if the pedal duration on the pedal is the short-time pedal; and determine the custom instruction comprises the long-pedal immediate execution instruction, the self-starting instruction, or the specific page instruction if the pedal duration on the pedal is the long-time pedal.

9. The vehicle computer of claim 8, wherein the at least one processor is configured to control the vehicle to perform the vehicle behavior corresponding to the custom instruction, is further configured to:

obtain the self-starting instruction corresponding to the long-time pedal if the pedal duration on the pedal is the long-time pedal, wherein the self-starting instruction comprises an instruction of recording video; and open a video recording function of the vehicle based on the instruction of recording video.

10. The vehicle computer of claim 7, wherein the custom instruction corresponds to an initial vehicle behavior, the at least one processor is further configured to:

receive a type of selection information of the custom instruction; and update the initial vehicle behavior to a first vehicle behavior based on the type of selection information of the custom instruction, wherein the type of selection information carries the first vehicle behavior.

11. The vehicle computer of claim 10, wherein the at least one processor is further configured to:

display the pedal duration on the pedal and execution information of the custom instruction matched with the pedal duration on the pedal.

* * * * *